United States Patent
Sitaraman et al.

(10) Patent No.: US 6,668,283 B1
(45) Date of Patent: Dec. 23, 2003

(54) ISDN B-CHANNEL COUNT LIMITATION

(75) Inventors: Aravind Sitaraman, Santa Clara, CA (US); Craig Michael Alesso, Lake Elmo, MN (US); Charles Troper Yager, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/316,538

(22) Filed: May 21, 1999

(51) Int. Cl.⁷ .............................................. G06F 13/00
(52) U.S. Cl. ...................................... 709/229; 320/230
(58) Field of Search ................................. 709/229, 225; 370/230

(56) References Cited

U.S. PATENT DOCUMENTS

| | | | | |
|---|---|---|---|---|
| 5,241,594 A | | 8/1993 | Kung | 380/4 |
| 5,276,679 A | * | 1/1994 | McKay et al. | 370/358 |
| 5,280,470 A | | 1/1994 | Buhrke et al. | |
| 5,442,630 A | | 8/1995 | Gagliardi et al. | |
| 5,444,703 A | * | 8/1995 | Gagliardi et al. | 370/401 |
| 5,463,629 A | * | 10/1995 | Ko | 340/825.5 |
| 5,479,407 A | * | 12/1995 | Ko et al. | 370/231 |
| 5,574,861 A | * | 11/1996 | Lorvig et al. | 370/410 |
| 5,655,077 A | | 8/1997 | Jones et al. | 395/187.01 |
| 5,684,950 A | | 11/1997 | Dare et al. | 395/187.01 |
| 5,715,394 A | | 2/1998 | Jabs | 395/200.11 |
| 5,835,727 A | | 11/1998 | Wong et al. | 395/200.68 |
| 5,845,070 A | | 12/1998 | Ikudome | 395/187.01 |
| 5,845,211 A | * | 12/1998 | Roach, Jr. | 455/428 |
| 5,852,812 A | | 12/1998 | Reeder | 705/39 |
| 5,857,102 A | | 1/1999 | McChesney et al. | 395/653 |
| 5,898,780 A | | 4/1999 | Liu et al. | 380/25 |
| 5,944,824 A | | 8/1999 | He | 713/201 |
| 6,070,192 A | * | 5/2000 | Holt et al. | 709/200 |
| 6,092,196 A | | 7/2000 | Reiche | 713/200 |
| 6,118,768 A | * | 9/2000 | Bhatia et al. | 370/254 |
| 6,119,160 A | | 9/2000 | Zhang et al. | |
| 6,141,687 A | | 10/2000 | Blair | 709/225 |
| 6,298,383 B1 | * | 10/2001 | Gutman et al. | 709/229 |

OTHER PUBLICATIONS

Carrel, D. et al. The TACACS+ Protocol, Version 1.78, Cisco Systems, Inc., printed from ftp://ftp–eng.cisco.com/gdweber/tac–rfc.1.78.txt on Oct. 23, 2000.
Ascend Access Control, Product Information, Ascend Communications, Inc., 1997. Retrieved from the Internet: <URL: http//www.ascend.com>, 4 pages.

(List continued on next page.)

*Primary Examiner*—Hassan Kizou
*Assistant Examiner*—Dmitry Levitan
(74) *Attorney, Agent, or Firm*—Thelen Reid & Priest LLP; David B. Ritchie (57) ABSTRACT

A data communications network with at least one PoP maintains a local cache database associated with each AAA service at the PoP on the data communications network. Each local database contains a group identification such as a domain identification corresponding to a group of users or an FQDN specifying a group of one individual, a maximum number of B-Channels to provide the group of users at the PoP and a dynamic B-Channel session count corresponding to active B-Channel connections currently provided to the group of users at the PoP. Actions are taken when the group attempts to exceed the maximum number of B-Channels by more than a predetermined number. The actions may include assessing extra charges, denying access, and sending warning messages to appropriate recipients. The local database may be synchronized by publishing B-Channel connection and disconnection events to all subscribing local databases. For proxy authentication users, the authentication information is published to the local caches of each AAA service at the PoP upon the first log-in of the user so as to avoid the need to proxy each successive connection authentication to a remote AAA service.

31 Claims, 6 Drawing Sheets

LOCAL DATABASE 40

| FQDN | AAA | SHARED SECRET | PORT | MAX B CHANNELS | ABS MAX B CHANNELS | CACHED AUTHENTICATION | B CHANNEL COUNT | |
|---|---|---|---|---|---|---|---|---|
| isp.net | | | | | | | | |
| joe@isp.net | | | | | | | | |
| usera@isp.net | | | | 2 | 3 | | 2 | |
| userb@isp.net | | | | 2 | 3 | | 3 | |
| corpa.com | | | | 15 | 25 | | 17 | |
| corpb.com | | | | 25 | 35 | | 26 | |

OTHER PUBLICATIONS

Cisco User Control Point, Product Information [online], Jun. 10, 1998, [retrieved on Sep. 10, 1998], retrieved from the Internet: <URL:http//www.cisco.com/wrap/pubic/728/ucp/ucp_ds.htm>, 4 pages.

Edell, Richard J. et al;., "Billing Users and Pricing for TCP", 1995, IEEE, Journal on Selected Areas in Communications, pp. 1–14.

* cited by examiner

LOCAL DATABASE

| FQDN | AAA | SHARED SECRET | PORT | MAX B CHANNELS | ABS MAX B CHANNELS | CACHED AUTHENTICATION | B CHANNEL COUNT |
|---|---|---|---|---|---|---|---|
| isp.net | | | | | | | |
| joe@isp.net | | | | | | | |
| usera@isp.net | | | | 2 | 3 | | 2 |
| userb@isp.net | | | | 2 | 3 | | 3 |
| corpa.com | | | | 15 | 25 | | 17 |
| corpb.com | | | | 25 | 35 | | 26 |

ISDN B-CHANNEL COUNT LIMITATION

BACKGROUND OF THE INVENTION

1. Field of the Invention

The present invention relates to the field of data communications networks. More particularly, this invention relates to a method and apparatus for limiting the number ISDN B-Channels that a group or individual is permitted to simultaneously use to communicate with one or more network access servers (NASes) at a point of presence (PoP) of a data communications network.

2. The Background

As well known to those of ordinary skill in the art, narrowband integrated services digital network (N-ISDN), or simply "ISDN" herein, is a telecommunications service provided by telephone companies (Telcos) to users for transferring digital information at relatively high speeds as compared to analog telephone circuits. Users typically receive a connection capable of a single "D-Channel" for out-of-band digital control signaling and one or more Basic Rate Interface "B-Channels" for 64-kbps data communications each. As it is possible to receive up to a maximum 23 or 30 B-channels depending upon one's service, it is therefore possible to construct parallel communications links which have large bandwidth.

Figure 1:
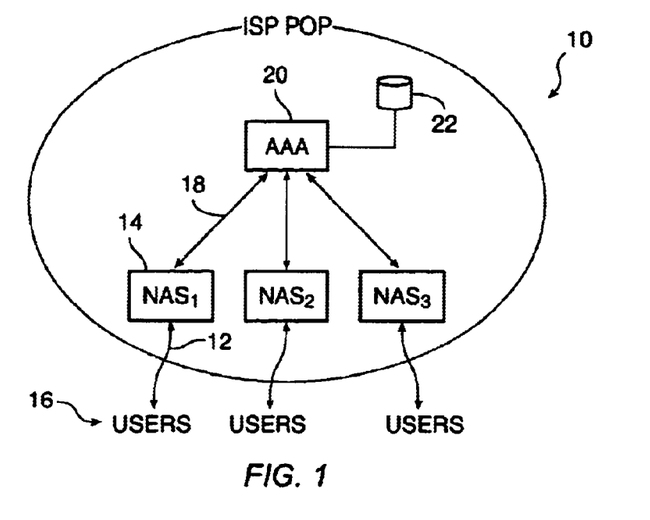
FIG. 1 is a system block diagram of a simple ISP PoP using a conventional retail-only paradigm.

Internet Service Providers (ISPs) and Telcos which provide internet service over dial-up ISDN lines generally expect that they will be providing service to a user with one or possibly two Basic Rate Interface B-Channels at 64 kbps each. Users and ISDN modem vendors have, however, figured out that a user with access to more than one B-Channel can initiate a relatively large number of Point-to-Point protocol (PPP) sessions between the user's computer and the ISP or Telco in order to create a multi-B-Channel digital link. These providers presently have no practical method for limiting users to a fixed number of B-Channels and/or charging a premium for such wide bandwidth links. In a typical retail model as shown in FIG. 1, an ISDN user will contact a network access server (NAS) using dial-up ISDN (integrated services digital network) telephone lines. The NAS interfaces the user with the data communications network. The way this works is that a user, for example, Joe@corpa.com, dials in to a NAS at ISP's Point of Presence (PoP$_1$) on the Internet. A PPP (point to point protocol) session 12 is raised between NAS$_1$ 14, and Joe's terminal 16. A LCP (Link Control Protocol) session is raised between NAS$_1$ and Joe's terminal. At this time the NAS$_1$ generates an AAA authentication request using a protocol such as RADIUS (Remote Authentication Dial-In User Service) to the ISP's AAA (authentication, authorization and accounting) service 20. The AAA service 20 handles Joe's authentication (receipt and verification of password and user name), provisions him with appropriate authorizations, and handles accounting for the time and services used by Joe on the data communications network. The AAA service uses a local database 22 to store and retrieve AAA information. To complete Joe's log-in, an access-accept packet is sent to NAS$_1$ from AAA service 20. Then an IPCP (Internet Protocol Control Protocol) session is raised between NAS$_1$ and Joe's terminal during which an IP address is returned to configure Joe's terminal's PPP stack. This completes the log-in of Joe. At present, there is little to restrict Joe from repeating this process a number of times to collect a number of B-Channel connections which can be paralleled to achieve a high bandwidth connection.

ISPs and Telcos (collectively sometimes referred to as "wholesale providers" or "wholesalers") also offer wholesale Internet access to subsidiary and specialized service providers, CLECs (Competitive Local Exchange Carriers), corporations, and Community of Interest (COI) providers. Naturally, the processing afforded customers of the wholesale variety differs from the processing afforded customers of the retail variety. Subscriber information for individual wholesale users is usually stored by those who lease data communications network access from the Wholesaler. Hence, corporations, CLECs and COI providers do not normally share their user information with the wholesale providers. The Wholesaler, however, typically also has its own retail subscribers whose user information is stored in its databases. In some cases, a particular user might have accounts with both a wholesale provider and a retail provider. Hence, the Wholesaler must distinguish between the user's wholesale and retail accounts and initiate different actions based upon their status or Service Level Agreements (SLAs).

Traditional wholesale ISPs and Roaming Service Providers offer network access through a technique called "authentication proxying." Proxying involves the transfer of the authentication responsibility to the "owner" of the subscriber. Thus, if a corporation was to outsource its corporate intranet to a Wholesaler, it would give up the maintenance of its dial-up servers (i.e., the NASes). It would not, however, normally want to give up the control of or information regarding its employees. Hence, when a corporate user connects to such a Wholesaler's network access servers, the user essentially perceives that the user is dialing into a corporate facility when the user is actually dialing into the Wholesaler's domain and then somehow gaining admittance to the corporation's intranet.

What really happens in that scenario is that the Wholesaler determines that the user belongs to Corporation A (Corp$_A$) by parsing either the fully qualified domain name ("FQDN") (e.g., Joe@corpa.com) supplied by the user, reading the Dialed Number Identification Service ("DNIS") ID associated with the call, reading the call-line identification ("CLID") associated with the call, or by using some other known mechanism. Using a DNIS ID, the Wholesaler looks at the telephone number (or a specific NAS in access networks other than dial-up) through which the user is connecting to the network. So if a user calls in to 123-456-7890 from his number of 123-444-5555, then the Wholesaler can know which number was called, i.e., the completing station. Having determined that the user trying to gain access belongs to Corp$_A$, the Wholesaler cannot authenticate the user by itself. As noted earlier, the user's record is still located on Corp$_A$'s equipment. Hence, the Wholesaler will "proxy" out the authentication transaction from its AAA proxy service to Corp$_A$. An AAA service within the corporation domain then identifies the user, verifies the password, and provisions the user with appropriate authorizations. It may also receive accounting information, if desired. Then the AAA service at Corp$_A$ notifies the Wholesaler's proxy service that the user is acceptable and passes along provisioning details associated with the user (such as an IP (Internet protocol) address to use or a pool identification of an IP address pool from which an IP address needs to be allocated and any other information that maybe needed). The Wholesaler then grants the user access to the network based upon the reply it gets back from Corp$_A$. This technique is called "proxying." This is shown diagrammatically in FIG. 2.

Figure 2:
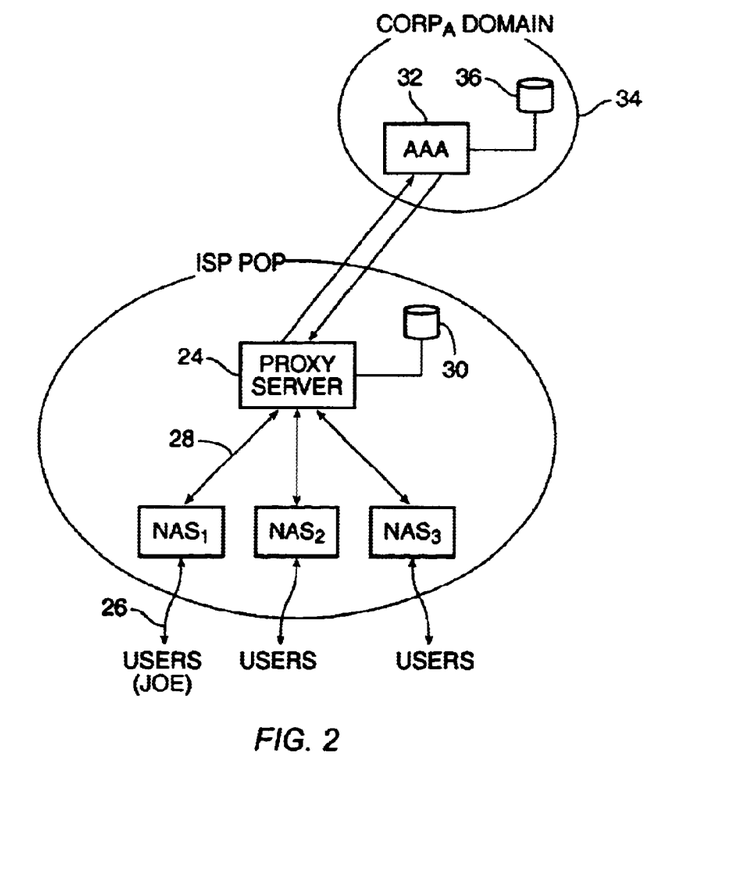
FIG. 2 is a system block diagram of wholesale ISP PoP using a conventional wholesale-only paradigm.

To be able to perform basic proxying, the Wholesaler maintains minimal information on its proxy service 24 at its PoP. Information such as supported domain names, the IP address to which the transaction is to be sent, the port number (typically an OSI Layer 4 port number) to which the transaction is to be addressed, a shared secret between the proxy service and the remote AAA service, etc., are typically stored on proxy service 24's local configuration database 30.

For example, user Joe@corpa.com dials in to $NAS_1$. A PPP (point to point protocol) session 26 is typically raised between Joe's terminal and $NAS_1$ as is a LCP (Link Control Protocol) session. At this time the $NAS_1$ generates an authentication request using a protocol such as RADIUS (Remote Authentication Dial-In User Service) to proxy service 24. Proxy service 24 then consults its local configuration database 30. Proxy service 24 then makes a determination about where to send the access-request packet. Here it decides to send it to the AAA service 32 maintained in the $Corp_A$ domain 34. The $Corp_A$ AAA 32 then consults its local database 36 and authenticates Joe@corpa.com. $Corp_A$ AAA 32 then returns an access-accept packet to proxy service 24 which, in turn, sends an access-accept packet to $NAS_1$. Then an IPCP (Internet Protocol Control Protocol) session is raised between $NAS_1$ and Joe's terminal during which an IP address is returned to configure Joe's terminal's PPP stack, thus completing the log-in of Joe@corpa.com.

Frequently a large corporation or similar entity will have a need to provide PoPs at a number of locations to service its clients, customers and/or employees in a number of different cities. For example, a corporation "$Corp_A$" located in Los Angeles, Calif. might have some employees using dial-up lines from San Francisco, Calif. and New York City, N.Y. Particularly in this situation, as in the situation of individual conventional retail subscribers, it is desirable for an individual or a "group" of users such as a corporation, COI or the like to be able to arrange with the ISP to attain a certain level of B-Channel ISDN coverage at a particular PoP. Accordingly, the ISP or Telco would like to enter into an arrangement with the group whereby the group pays a fee for a more or less specific maximum number of B-Channels to be used at any one time. When the group exceeds this contracted number it is either cut off or charged an extra fee. In this regard, the term "group" is meant to include an individual user. In this way the ISP or Telco is able to plan for its expansion and receive realistic information on the number of these sessions that it must be able to support.

SUMMARY OF THE INVENTION

A data communications network with at least one PoP maintains a local cache database associated with each AAA service at the PoP on the data communications network. Each local database contains a group identification such as a domain identification corresponding to a group of users or an FQDN specifying a group of one individual, a maximum number of B-Channels to provide the group of users at the PoP and a dynamic B-Channel session count corresponding to active B-Channel connections currently provided to the group of users at the PoP. Actions are taken when the group attempts to exceed the maximum number of B-Channels by more than a predetermined number. The actions may include assessing extra charges, denying access, and sending warning messages to appropriate recipients. The local database may be synchronized by publishing B-Channel connection and disconnection events to all subscribing local databases. For proxy authentication users, the authentication information is published to the local caches of each AAA service at the PoP upon the first log-in of the user so as to avoid the need to proxy each successive connection authentication to a remote AAA service.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, processes and/or data structures may be implemented using C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

In accordance with one embodiment of the present invention the B-Channel imitation may be handled by a AAA service implemented within a protocol gateway (PGW). PGWs are devices which couple users via a network access server (NAS) to the data communications network by dynamically converting protocols. The term gateway is not meant to be limited to a single type of device, as any device, hardware or software, that may act as a bridge between the user and the network may be considered a gateway for the purposes of this application. In accordance with one presently preferred embodiment of the present invention, the PGW may be a software service operating on a general purpose computer running the User Control Point (UCP) software package available from Cisco Systems, Inc. of San Jose, Calif.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with a presently preferred embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+ or DIAMETER can be used as acceptable authentication communications links between the various communications devices that encompass the data communications network and till be within the inventive concepts disclosed herein.

In accordance with the present invention retail users such as usera@isp.net and userb@isp.net and wholesale users such as $Corp_A$ and $Corp_B$ will subscribe with an ISP or Telco providing Internet connectivity for a certain maximum number of B-Channels at particular PoPs on the network. For example, the wholesale users could subscribe to a maximum number of B-Channels of 15 and 25, respectively, at a particular PoP while the individual users might subscribe to 2. If the maximum is exceeded at the PoP then the next attempted B-Channel connection can be handled in a number of different ways. First, it can simply be refused. Second, it can be accepted up to an "absolute maximum" of, say, 25 and 35, respectively for the wholesale clients and 3 for the individuals. This absolute maximum provides some warning room before denying service to a user. Optionally, customers can be warned when they are exceeding the maximum without suffering a denial of service. They may also be charged an extra fee for the extra service, if desired. The extra fee would be charged by initiating a special RADIUS accounting packet in response to the B-Channel connection over the maximum and sending it to the proper AAA service. Ideally the customers would adjust their service contracts to the level of use they are actually making of the B-Channels at the PoP.

Figure 3:
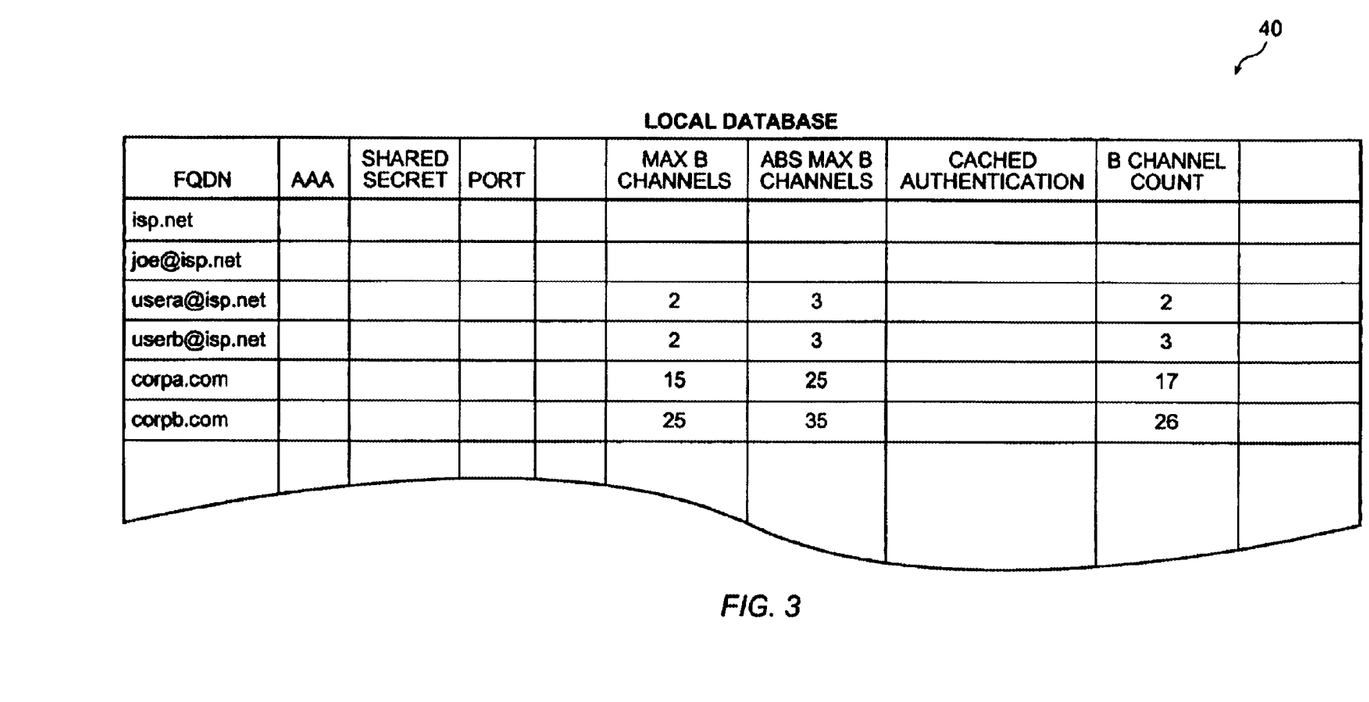
FIG. 3 is a diagram illustrating the information stored in a local database in accordance with a presently preferred embodiment of the present invention.

To implement the invention, it is necessary to keep track of data not previously tracked in a data communications network. Local Database 40 shown in FIG. 3 maintains a list identifying customer "groups" that have subscribed to B-Channel access. Each group identification has associated therewith a value for "maximum B-Channels" which indicates the number of B-Channels that the group is ordinarily entitled to at the particular PoP. In the example of FIG. 3, $Corp_A$ is entitled to 15 and $Corp_B$ is entitled to 25. Normally this means that if a user from $Corp_A$ dials into a PoP requesting a B-Channel or an additional B-Channel, the ISP or Telco is required to service the user as long as the user's connection won't exceed the maximum number of B-Channels assigned to $Corp_A$ at the PoP.

Note that the "group" may be based on network domain name such as "Corpa.com", or on some other determinable characteristic such as an individual user's FQDN (e.g., Joe@ISP.NET). Since the DNIS ID and/or the CLID may be used, it is possible to group users by the telephone numbers that they call from or dial into rather than by FQDN or domain. Hence a group may have any number of diverse users in it. The term "group" will be used herein for simplicity, but it is meant in this broader sense to be inclusive of any such determinable group of users.

Optionally an "Absolute Maximum B-Channels" value may be kept to indicate how many B-Channels the group may actually get before denial of service. In the example of FIG. 3 $Corp_A$ is entitled to 25 and $Corp_B$ is entitled to 35. As pointed out above, there may be an extra charge levied for exceeding the maximum B-Channels value up to the Absolute Maximum B-Channel's value.

Figure 4:
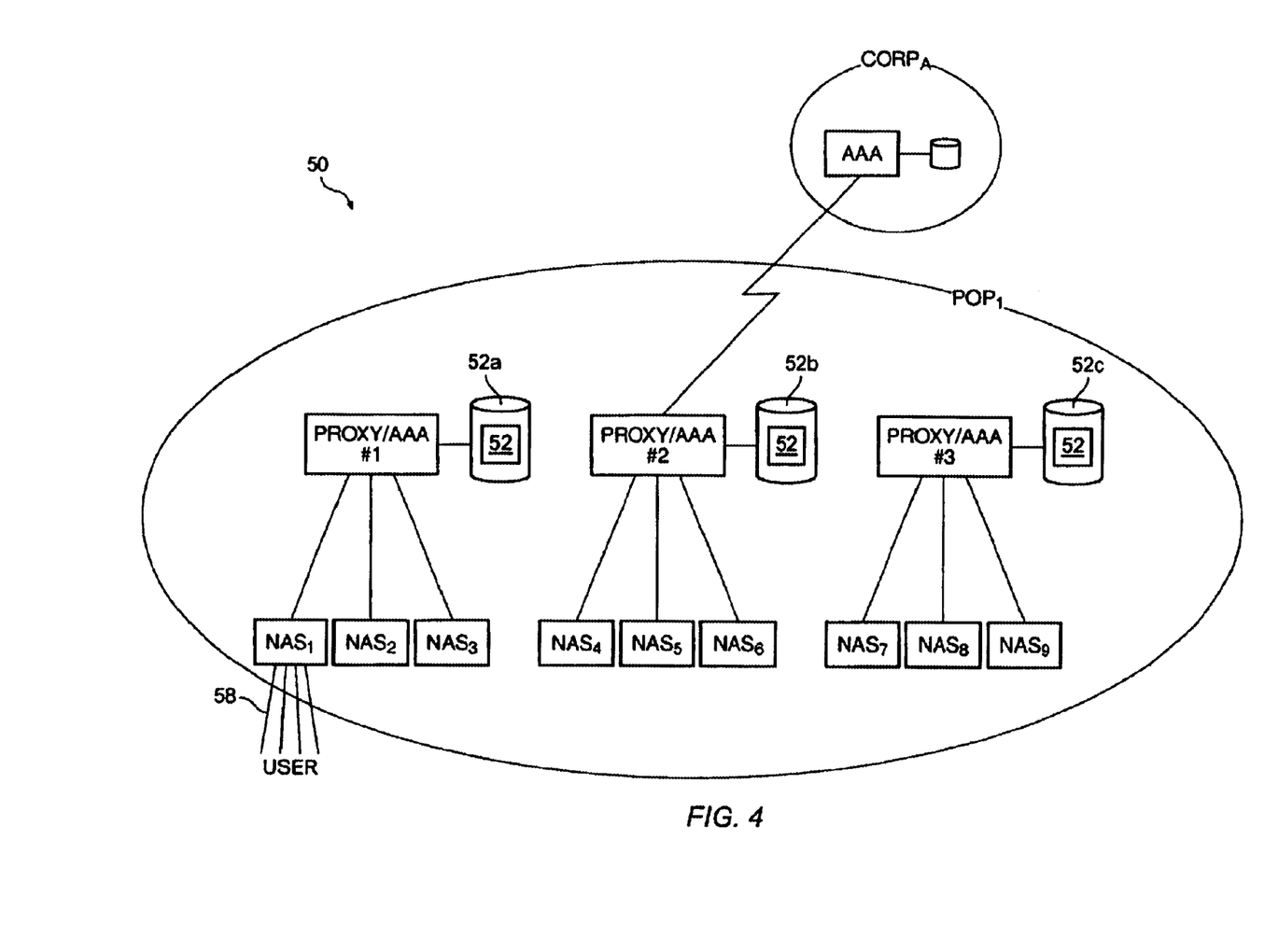
FIG. 4 is a system block diagram of a portion of data communications network in accordance with a presently preferred embodiment of the present invention.

Local database 40 also keeps a count of the current number of B-channels in use by each group at the PoP. When B-Channels are added by a group, the count is incremented. When they are dropped, the count is decremented. Since a B-Channel may be added or dropped at any of the NASes $NAS_1$–$NAS_9$ as illustrated in FIG. 4, a mechanism for synchronizing the data contained in the local cache databases 52a, 52b and 52c associated with corresponding Proxy/AAA services 1, 2 and 3 within PoP, is required. This current count is preferably maintained by the broker-publisher system described in more detail below.

An ISP or Telco may wish to take action in a conservative manner, as by adding a fixed number of "grace" B-Channels to avoid penalizing a client before the client has clearly exceeded the terms of its service contract by more than a reasonable level. On the other hand, the "grace" number may also be set to zero.

The Local Database 40 may also contain additional information as desired. Local Database 40 is associated with each NAS of each PoP on the data communications network and may be stored in local cache memory associated with the NAS and located at each PoP or in any other convenient fashion. There is no requirement that they be stored at the PoP, it just may be convenient to do so.

FIG. 4 is a simplified block diagram of a data communications network 50 in accordance with a presently preferred embodiment of the present invention. The Network includes $PoP_1$. $PoP_1$ has Plural Proxy/AAA services 1, 2, 3 as shown, each with a corresponding local cache 52a, 52b and 52c in which is maintained an associated local database 52 as shown. Each Proxy/AAA service is coupled to one or more NASes as shown. A multi-channel PPP B-Channel connection 58 has been raised between an ISDN NAS at $PoP_1$ and a user. The multiple channels may span more than one NAS.

Figure 5:
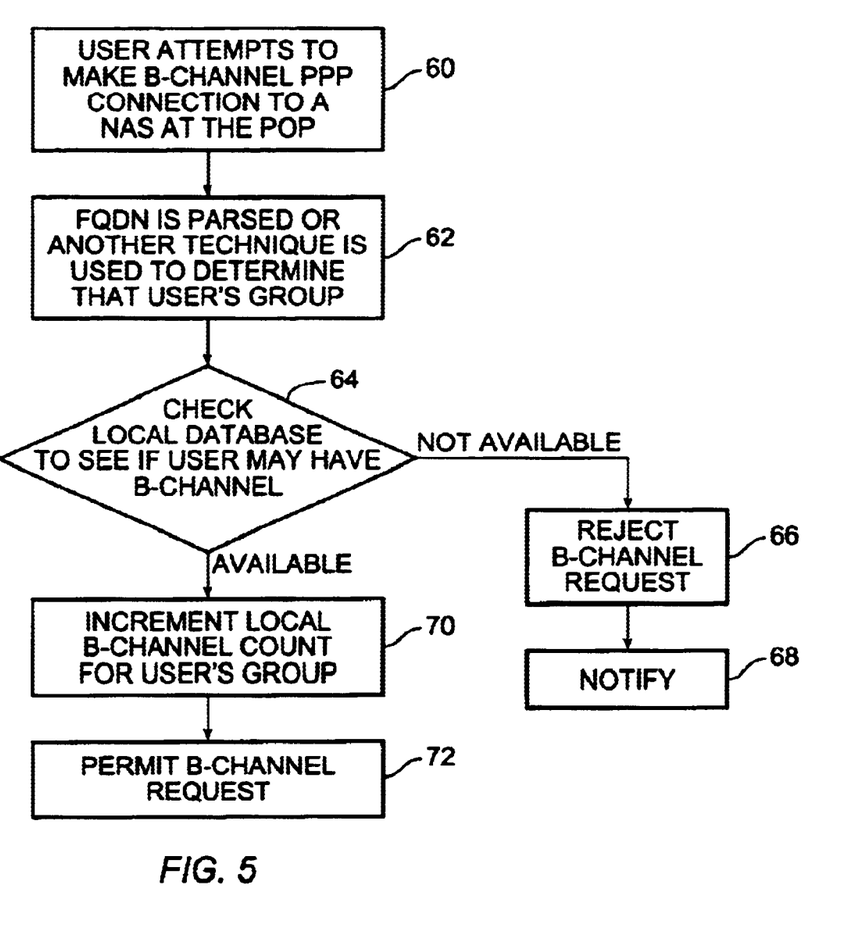
FIG. 5 is a flow diagram of a process for verifying additional B-Channel availability for a user on a data communications network in accordance with a presently preferred embodiment of the present invention.

FIG. 5 is a flow diagram illustrating the B-Channel connection process for an ISDN user in accordance with a presently preferred embodiment of the present invention. At block 60 the user attempts to make an initial or additional B-Channel connection to a NAS at $PoP_1$. At block 62 the group of the user is determined. This may be done in one of several ways as discussed above, but most commonly involves parsing the FQDN of the user to determine his domain or, if an individual, his FQDN. At block 64 the local database 40 is searched for the group entry corresponding to the user. If additional B-Channels are available (i.e., absolute maximum B-Channels is not exceeded) then control transfers to block 70. Otherwise, the B-Channel request is rejected at block 66 and optionally the group administrator and/or user is notified in a conventional manner as set forth in the process at block 68.

Optionally, some sort of "grace" level may be applied at block 64 so that rejection of the B-Channel connection request does not occur precisely at the level specified in the service agreement with the domain.

At block 70, the B-Channels in use count in the local database 40 is incremented. At block 72 the user is permitted to make the B-Channel connection. The user must still be authenticated and authorized, presumably by an AAA service at PoP, or at a remote site.

Figure 6:
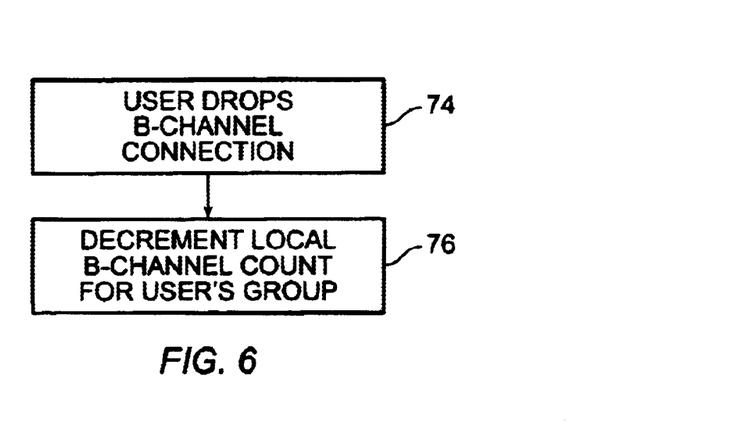
FIG. 6 is a flow diagram of a process for updating B-Channel availability information in a data communications network in accordance with a presently preferred embodiment of the present invention.

When a user drops the B-Channel, e.g., at log out, it is important to decrement the B-Channels in use counts so that an accurate count is always kept. FIG. 6 shows how this is done. At block 74 the user drops the B-Channel, as by initiating the log out process. At block 76 the B-Channel count in local database 40 is decremented.

Figure 7:
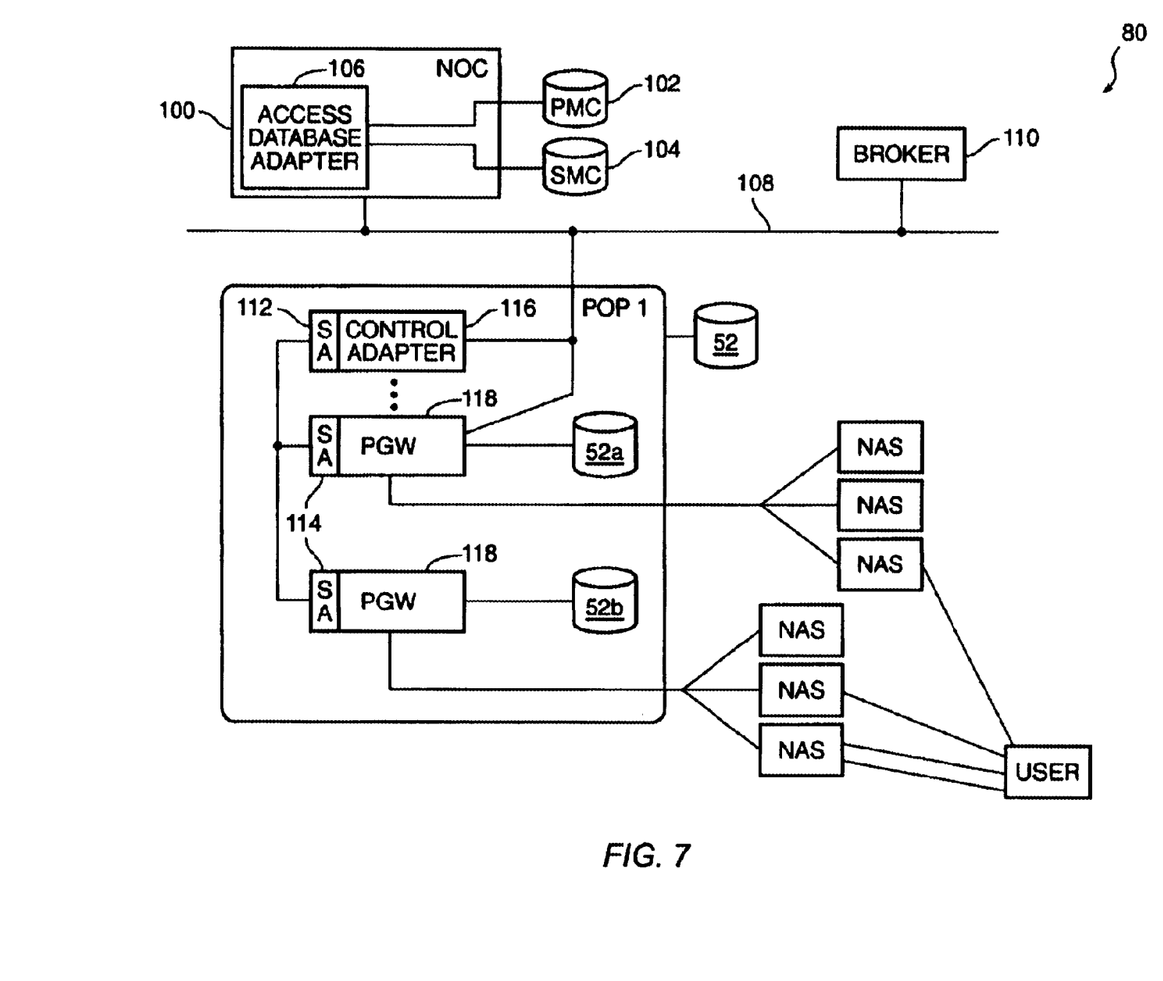
FIG. 7 is a system block diagram schematically illustrating a portion of a data communications system in accordance with one embodiment of the present invention.

FIG. 7 is a system block diagram of a portion of data communication network 80 in accordance with a presently preferred embodiment of the present invention. Network Operations Control Center (NOC) 100 is located centrally on the network 80. There may be more than one NOC on a particular data communications network. Typically each Wholesaler will have at least one NOC. The Primary Mother Cache (PMC 102) and Secondary Mother Cache (SMC 104) are memory storage components associated with NOC 100. An access database adapter 106 is in communication with PMC 102 and SMC 104 as well as an information bus 108. This adapter, and other adapters provide bi-directional mapping of information between components and other services comprising the data communications network 80. Adapters, such as the access database adapter 106 subscribe to and publish events. An event is an independent entity which contains an unspecified amount of non-time critical information. For example, the access database adapter 106 receives commands to publish an event. The information contained in the event may be found in the request or the access database adapter 106 may communicate with the PMC 102 to find the required information. The event is then published to other services and components within the data communications network across an information bus 108 which may be the data communications network itself. Of course this is only one way to achieve data synchronization—one can easily implement a centralized model or a fully meshed communication model to achieve the same end.

The information bus 108 that serves as the transportation medium for the presently preferred embodiment of the present invention can be Common Object Request Broker Architecture (CORBA)-based the CORBA-based information bus is capable of handling the communication of events to and from objects in a distributed, multi-platform environment. The concept of a CORBA-based information bus is well known by those of ordinary skill in the art. Other acceptable communication languages can be used as are also known by those of ordinary skill in the art. Other transportation models are available as well, such as the Distributed Component Object Model (DCOM), which will readily achieve the same end.

CORBA provides a standard way of executing program modules in a distributed environment. A broker 110, therefore, may be incorporated into an Object Request Broker (ORB) within a CORBA compliant network. To make a request of an ORB, a client may use a dynamic invocation interface (which is a standard interface which is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifies the object being invoked, which the method can use to locate the data for the object. When the method is complete, it returns, causing output parameters or exception results to be transmitted back to the client.

Figure 8:
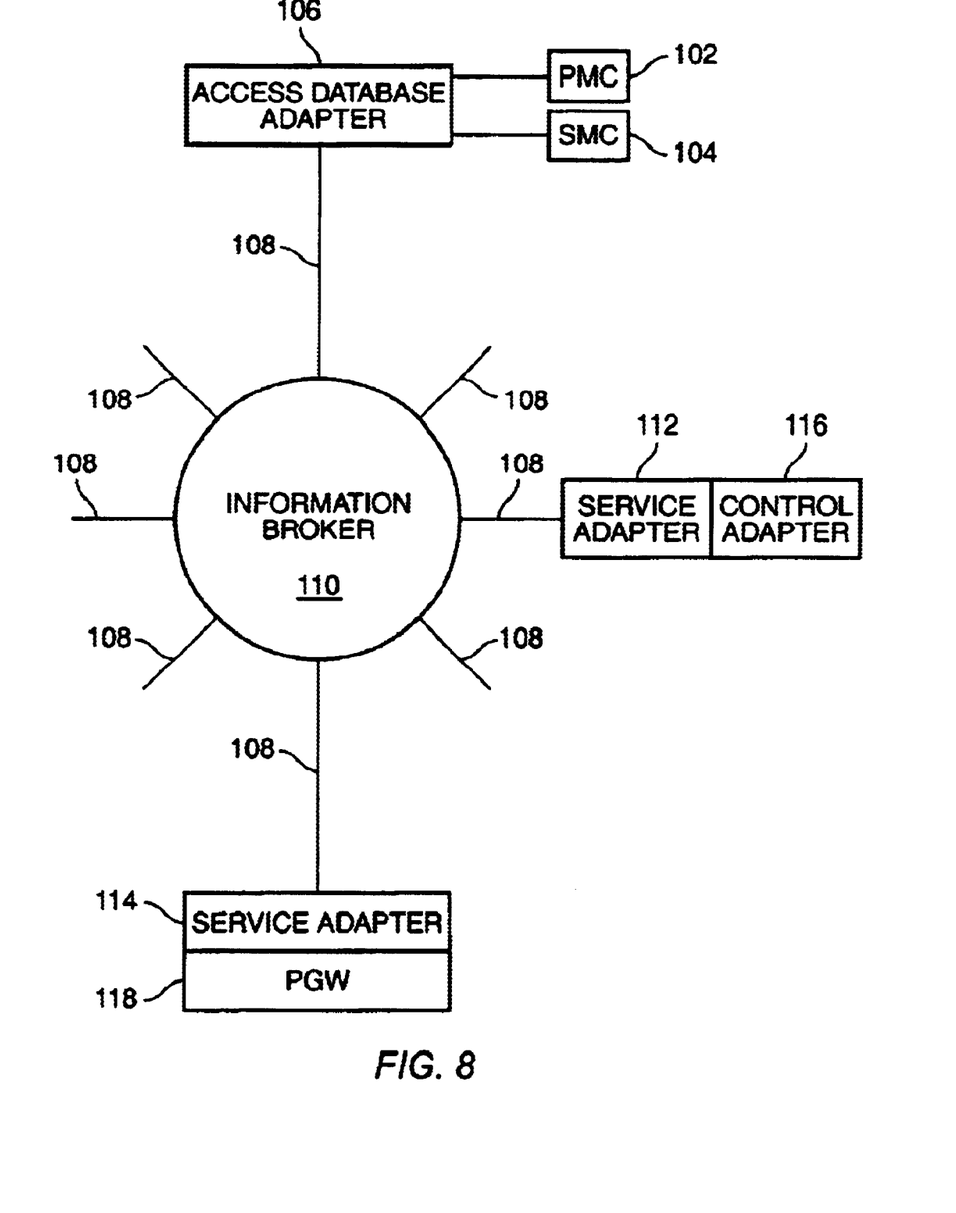
FIG. 8 is a block diagram schematically and conceptually illustrating operation of an information broker in accordance with one embodiment of present invention.

In accordance with a presently preferred embodiment of the present invention an Enterprise Application Integration (EAI) system is used to broker the flow of information between the various service and adapters comprising the data network management system of the present invention. An example of an EAI system that can be incorporated in the presently preferred invention is the ActiveWorks Integration System, available from Active Software of Santa Clara, Calif. As shown in FIG. 8, such an EAI system uses an information broker 110 as the hub of the system. The information broker 110 acts as the central control and storage point for the system. The information broker 110 can reside on a server and serves to mediate requests to and from networked clients; automatically queuing, filtering and routing events while guaranteeing delivery. The information broker 110 is capable of storing subscription information and using such subscription information to determine where published information is to be sent. Referring back to FIG. 7, the information broker 110 is shown as being located at a point along the information bus 108. In most instances, the broker will be located within the same NOC 100 as the host that runs the access database adapter 106 application. Another key feature to the EAI system of FIG. 8 is the use of service adapters ("SA") 112 and 114 that allow users of the EAI system to integrate diverse applications and other information when using the integration system. Service adapters 112 and 114 provide biidirectional mapping of information between an application's native format and integration system events, enabling all custom and packaged applications, databases, and Internet and other network applications to exchange information. As shown in FIG. 8 the service adapters 112 and 114 run in association with the various services 116 and 118 from which information is published and subscribed on to an information bus 108 that has its hub at the broker 110.

Referring back to FIG. 7 the information bus 108 is in communication with a Point of Presence (PoP) (PoP$_1$) within the data communications network 80. POP1 is one of many PoPs with which the information bus 108 is in communication. Located within PoP$_1$ is a host or node which may comprise one or more computing devices on which may be running some or all of the services shown in FIG. 7. The mode is in communication with the information bus 108 through a control adapter 116 which provides control communications with the various services such as a PGW 118 through their respective service adapters 114, via service adapter 112 or control adapter 116. Those of ordinary skill in the art will appreciate that the services shown are not intended to be limiting and that other services and other service configurations can be used without departing from the inventive concepts herein disclosed. The system services may also be distributed over two or more servers to provide improved performance and redundancy.

The protocol gateway service 118 is used to couple the network user to the data communication network. The protocol gateway service 118 functions as an interface to the NASes that allows access requests received from a user to be serviced using components that may communicate using different protocols. A typical protocol gateway service 118 may be able to support different user access methodologies, such as dial-up, frame relay, leased lines, cable, DSL (Digital Subscriber Line), and the like.

Thus, in one embodiment of the invention, the broker-publisher system described above is used to publish ISDN B-Channel log-in events from the PGW 118 or other access port of the data communications network 80 to the other (subscribing) PGWs (proxy/AAA services) and/or their corresponding local databases within PoP$_1$. This is done so that the local databases may receive the current B-Channel use information so that the decision to accept or reject an additional log-in attempt may be made locally at the Proxy/AAA within the PoP.

Thus, in an example of the operation of this invention, a user "usera" will perform an ISDN dial-in to $PoP_1$ and come in on $NAS_1$. Since this is the first group member to log-in at this PoP, the proxy/AAA service associated with $NAS_1$ will obtain authentication from an appropriate AAA server at usera's home domain. Since it is convenient to store these records locally, they will preferably be cached locally and published to all local proxy/AAA services within $PoP_1$ adding an entry for usera's group. The first B-Channel connection will proceed to completion and a publication event will inform all proxy/AAA services within $PoP_1$ of that connection. Now, if usera attempts to initiate another B-Channel connection at $PoP_1$, no matter what NAS he comes in on at $PoP_1$, the corresponding proxy/AAA service will have the needed information to (1) authenticate without further effort (by checking the local cache) and (2) accept or deny the attempt based upon a current B-Channel count. An additional benefit of the present invention is that it allows usera to be provisioned (if necessary) with an IP address once rather than at each subsequent B-Channel connection. Since only one IP address is necessary, this preserves IP address resources and avoids confusion as to the IP address being used by usera.

Alternative Embodiments

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for limiting to a predetermined number the quantity of B-Channel connections used at a Point of Presence (PoP) of a data communications network by users belonging to a particular group, said method comprising:
    maintaining a local database associated with a particular PoP of the data communications network, the database including:
        group identifications,
        a maximum numbers of B-Channel connections to for each group at the PoP,
        a predetermined number assigned for each group, the predetermined number permitting B-Channel connections to exceed the maximum number for the group by that number, and
        a current B-Channel connection count for each group at the PoP; and
    responding to a user's attempt to initiate a B-Channel connection on the data communications network as a member of a particular group by checking the local database to determine if the user's B-Channel connection would make the current B-Channel connection count for the group exceed by the predetermined number the maximum number of B-Channel connections for the group at the PoP.

2. A method according to claim 1, wherein said responding includes:
    rejecting the user's attempt to initiate a B-Channel connection if the user's B-Channel connection would make the current B-Channel connection count for the group exceed by the predetermined number the maximum number of B-Channel connections for the group.

3. A method according to claim 1, wherein said responding includes:
    allowing the user's attempt to initiate a B-Channel connection if the user's connection would not make the current B-Channel connection count exceed by the predetermined number the maximum number of B-Channel connections for the user's group.

4. A method according to claim 3, further comprising:
    incrementing the current B-Channel connection count for the user's group at the local database in response to allowing the user's B-Channel connection.

5. A method according to claim 1, further comprising:
    decrementing the current B-Channel connection count for the user's group at the local database in response to a user's B-Channel connection termination.

6. A method according to claim 1 wherein said maintaining includes publishing B-Channel connection events occurring at proxy/AAA services of the PoP to other subscribing proxy/AAA services of the PoP.

7. A method according to claim 6 wherein said maintaining includes publishing B-Channel disconnection events occurring at proxy/AAA service of the PoP to other subscribing proxy/AAA services of the PoP.

8. A method according to claim 1 wherein said maintaining includes publishing B-Channel connection events occurring at proxy/AAA services of the PoP to subscribing local caches associated with other proxy/AAA services of the PoP.

9. A method according to claim 8 wherein said maintaining includes publishing B-Channel disconnection events occurring at proxy/AAA services of the PoP to subscribing local caches associated with other proxy/AAA services of the PoP.

10. A method according to claim 1 wherein said responding includes:
    sending a notification to a user if the user's attempted connection makes the current B-Channel connection count for the user's group exceed the maximum number of B-Channel connections for the group.

11. A data communications network capable of limiting access to a predetermined number of B-Channel connections belonging to a particular group at a PoP of the data communications network, said data communications network comprising:
    a local database associated with a particular PoP of the data communications network, said local database including:
        group identifications,
        a maximum numbers of B-Channel connections for each group at the PoP,
        a predetermined number assigned for each group, the predetermined number permitting B-Channel connections to exceed the maximum number for the group by that number, and
    a current B-Channel connection count for each group at the PoP; and
    a local database checker which, in response to a user's attempt to initiate a B-Channel connection at the PoP of the data communications network as a member of a particular group, checks the local database to determine if the user's B-Channel connection would make the current B-Channel connection count for the group exceed by the a predetermined number the maximum number of B-Channel connections for the group at the PoP.

12. A data communications network according to claim 11, further comprising:

a B-Channel connection rejecter which rejects the user's attempt to initiate a B-Channel connection if the user's B-Channel connection would make the current B-Channel connection count for the group exceed by the predetermined number the maximum number of B-Channel connections for the user's group at the PoP.

13. A data communications network according to claim 11, further comprising:

a B-Channel connection acceptor which allows the user's attempt to initiate a B-Channel connection if the user's connection would not make the current B-Channel connection count exceed by the predetermined number the any maximum number of B-Channel connections for the user's group.

14. A data communications network according to claim 13, further comprising:

a B-Channel connection count incrementer associated with the local database and the user's group, the B-Channel connection count incrementer incrementing the current B-Channel connection count in response to a user's B-Channel connection.

15. A data communications network according to claim 11, further comprising:

a B-Channel connection count decrementer associated with the local database and the user's group, the B-Channel connection count decrementer decrementing the current B-Channel connection count for the user's group at the local database in response to a user's B-Channel connection termination.

16. A data communications network according to claim 11, further comprising:

a notification sender for sending a notification to a user if the user's attempted connection makes the current B-Channel connection count for the user's group exceed the maximum number of B-Channel connections for the group.

17. A data communications network according to claim 11, further comprising:

an adapter associated with the PoP, said adapter publishing B-Channel connection events occurring at proxy/AAA services of the PoP to other subscribing proxy/AAA services of the PoP.

18. A method according to claim 11, wherein said adapter further publishes B-Channel disconnection events occurring at proxy/AAA service of the PoP to other subscribing proxy/AAA services of the PoP.

19. A data communications network according to claim 11, further comprising:

an adapter associated with the PoP, said adapter publishing B-Channel connection events occurring at proxy/AAA services of the PoP to subscribing local caches associated with other proxy/AAA services of the PoP.

20. A method according to claim 19, wherein said adapter further publishes B-Channel disconnection events occurring at proxy/AAA services of the PoP to subscribing local caches associated with other proxy/AAA services of the PoP.

21. A program storage device readable by a machine, tangibly embodying a program of instructions executable by the machine to perform method for limiting to a predetermined number of quantity of B-Channel connections used at a Point of Presence (PoP) of a data communications network by users belonging to a particular group, said method comprising:

maintaining a local database associated with a particular PoP of the data communications network, the database including group identifications,
a maximum numbers of B-Channel connections for each group at the PoP,
a predetermined number assigned for each group, the predetermined number permitting B-Channel connections to exceed the maximum number for the group by that number, and
a current B-Channel connection count for each group at the PoP; and responding to a user's attempt to initiate a B-Channel connection on the data communications network as a member of a particular group by checking the local database to determine if the user's B-Channel connection would make the current B-Channel connection count for the group exceed by the a predetermined number the maximum number of B-Channel connections for the group at the PoP.

22. A method for limiting to a predetermined number the quantity of B-Channel connections used at a Point of Presence (PoP) of a data communications network by users belonging to a particular group, said method comprising:

maintaining a plurality of local databases associated with a particular PoP of the data communications network, said databases including:

group identifications,
a maximum numbers of B-Channel connections for each group at the PoP,
a predetermined number assigned for each group, the predetermined number permitting B-Channel connections to exceed the maximum number for the group by that number, and
a current B-Channel connection count for each group at the PoP;

publishing B-Channel connection events to the plurality of local databases, the B-Channel connection events including a group identification and an event identification;

publishing B-Channel disconnection events to the plurality of local databases, the B-Channel connection events including a group identification and an event identification; and responding to a user's attempt to initiate a B-Channel connection on the data communications network as a member of a particular group by checking one of the plurality of local databases to determine if the user's B-Channel connection would make the current B-Channel connection counts for the grout exceed by the predetermined number the maximum number of B-Channel connections for the group at the PoP.

23. A method according to claim 22, wherein said responding includes:

rejecting the user's attempt to initiate a B-Channel connection if the user's B-Channel connection would make the current B-Channel connection count for the group exceed by the predetermined number the maximum number of B-Channel connections for the group.

24. A method according to claim 22, wherein said responding includes:

allowing the user's attempt to initiate a B-Channel connection if the user's connection would not make the current B-Channel connection count exceed by the predetermined number the maximum number of B-Channel connections for the user's group.

25. A method according to claim 24, further comprising:

incrementing the current B-Channel connection count for the user's group at the local database in response to allowing the user's B-Channel connection.

26. A method according to claim 22, further comprising:

obtaining, in response to the first log-in attempt of a user at the PoP, authentication information for said user;

caching, in said plurality of local databases, said authentication information.

27. A method according to claim 26 wherein said caching includes:

publishing said authentication information to said plurality of local databases.

28. A method according to claim 27 wherein said caching includes:

subscribing at said plurality of local databases to said published authentication information.

29. A method according to claim 22 wherein said responding includes:

sending a notification to a user if the user's attempted connection makes the current B-Channel connection count for the user's group exceed the maximum number of B-Channel connections for the group.

30. A method according to claim 22, further comprising:

decrementing the current B-Channel connection count for the user's group at the local database in response to a user's B-Channel connection termination.

31. A program storage device readable by a machine, tangibly embodying a program of instructions executable by the machine to perform a method for limiting to a predetermined number the quantity of B-Channel connections used at a Point of Presence (PoP) of a data communications network by users belonging to a particular group, said method comprising:

maintaining a plurality of local databases associated with a particular PoP of the data communications network, said databases including:

group identifications, a maximum numbers of B-Channel connections for each group at the PoP, a predetermined number assigned for each group, the predetermined number permitting B-Channel connections to exceed the maximum number for the group by that number, and a current B-Channel connection count for each group at the PoP;

publishing B-Channel connection events to the plurality of local databases, the B-Channel connection events including a group identification and an event identification;

publishing B-Channel disconnection events to the plurality of local databases, the B-Channel connection events including a group identification and an event identification; and responding to a user's attempt to initiate a B-Channel connection on the data communications network as a member of a particular group by checking one of the plurality of local databases to determine if the user's B-Channel connection would make the current B-Channel connection counts for the group exceed by the a predeternmined number the maximum number of B-Channel connections for the group at the PoP.

* * * * *

UNITED STATES PATENT AND TRADEMARK OFFICE
CERTIFICATE OF CORRECTION

PATENT NO. : 6,668,283 B1
DATED : December 23, 2003
INVENTOR(S) : Aravind Sitaraman, Craig Michael Alesso and Charles Troper Yager It is certified that error appears in the above-identified patent and that said Letters Patent is hereby corrected as shown below:

Column 2,
Line 61, replace "maybe" with -- may be --.

Column 4,
Line 54, replace "imitation" with -- limitation --.

Column 5,
Line 18, replace "till" with -- still --.

Column 8,
Line 2, replace "service" with -- services --.
Line 25, replace "biidirectional", with -- bi-directional --.

Column 9,
Line 45, after "connections" delete "to".

Signed and Sealed this

Seventh Day of September, 2004

JON W. DUDAS
*Director of the United States Patent and Trademark Office*